(12) United States Patent
Fan

(10) Patent No.: US 11,376,501 B2
(45) Date of Patent: Jul. 5, 2022

(54) METHOD AND APPARATUS FOR DISPLAYING MARKER ELEMENT IN VIRTUAL SCENE, COMPUTER DEVICE, AND COMPUTER-READABLE STORAGE MEDIUM

(71) Applicant: Tencent Technology (Shenzhen) Company Limited, Shenzhen (CN)

(72) Inventor: Yourui Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 101 days.

(21) Appl. No.: 16/926,257

(22) Filed: Jul. 10, 2020

(65) Prior Publication Data
US 2020/0338449 A1    Oct. 29, 2020

Related U.S. Application Data

(63) Continuation of application No. PCT/CN2019/082200, filed on Apr. 11, 2019.

(30) Foreign Application Priority Data

May 18, 2018   (CN) .......................... 201810480396.2

(51) Int. Cl.
*A63F 13/537* (2014.01)
*A63F 13/847* (2014.01)
(Continued)

(52) U.S. Cl.
CPC ........ *A63F 13/5372* (2014.09); *A63F 13/837* (2014.09); *G06F 3/04815* (2013.01);
(Continued)

(58) Field of Classification Search
None
See application file for complete search history.

(56) References Cited

U.S. PATENT DOCUMENTS

| | | | |
|---|---|---|---|
| 2008/0070684 | A1 | 3/2008 | Haigh-Hutchinson |
| 2009/0132931 | A1 | 5/2009 | Tatsubori |

(Continued)

FOREIGN PATENT DOCUMENTS

| | | |
|---|---|---|
| CN | 106453638 A | 2/2017 |
| CN | 107029425 A | 8/2017 |

(Continued)

OTHER PUBLICATIONS

Tencent Technology, WO, PCT/CN2019/082200, dated Jul. 9, 2019, 4 pgs.

(Continued)

*Primary Examiner* — Lawrence S Galka
(74) *Attorney, Agent, or Firm* — Morgan, Lewis & Bockius LLP

(57) ABSTRACT

This application relates to a method for displaying a marker element in a virtual scene performed at a terminal. The method includes: rendering a display interface of a virtual scene; obtaining marker indication information used for indicating a target virtual item marked by a user of the terminal corresponding to a user account in the virtual scene for user accounts in a same team to view, the user account controlling a current virtual object in the virtual scene; obtaining graphic data of a marker element according to the marker indication information, the marker element being a graphic element used for indicating a location of the target virtual item in the virtual scene to the user accounts in the same team; and rendering the marker element according to the graphic data at a designated location around the target virtual item in the display interface of the virtual scene.

20 Claims, 11 Drawing Sheets

(51) Int. Cl.
*A63F 13/426* (2014.01)
*A63F 13/216* (2014.01)
*A63F 13/5372* (2014.01)
*A63F 13/837* (2014.01)
*G06F 3/04815* (2022.01)

(52) U.S. Cl.
CPC ... *A63F 2300/204* (2013.01); *A63F 2300/306* (2013.01); *A63F 2300/8023* (2013.01); *A63F 2300/8076* (2013.01)

(56) References Cited

U.S. PATENT DOCUMENTS

| | | |
|---|---|---|
| 2011/0055919 A1 | 3/2011 | Hamilton, II et al. |
| 2015/0177950 A1 | 6/2015 | Wang |
| 2019/0076739 A1* | 3/2019 | Ge .................. A63F 13/837 |

FOREIGN PATENT DOCUMENTS

| | | | |
|---|---|---|---|
| CN | 107376339 A | 11/2017 | |
| CN | 107694086 A | 2/2018 | |
| CN | 107789837 A | 3/2018 | |
| CN | 107812384 A | 3/2018 | |
| CN | 107899241 A | 4/2018 | |
| CN | 108671543 A | 10/2018 | |

OTHER PUBLICATIONS

Tencent Technology, IPRP, PCT/CN2019/082200, dated Nov. 24, 2020, 5 pgs.
Tencent Technology, ISR, PCT/CN2019/082200, dated Jul. 9, 2019, 2 pgs.

\* cited by examiner

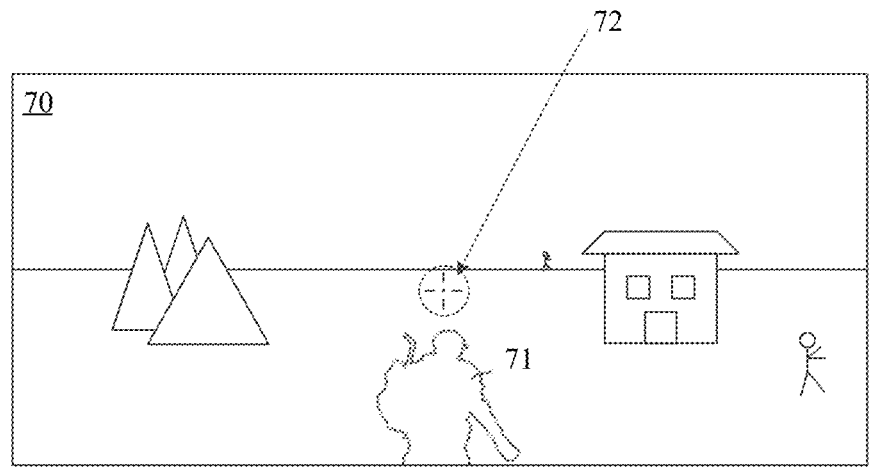
FIG. 7
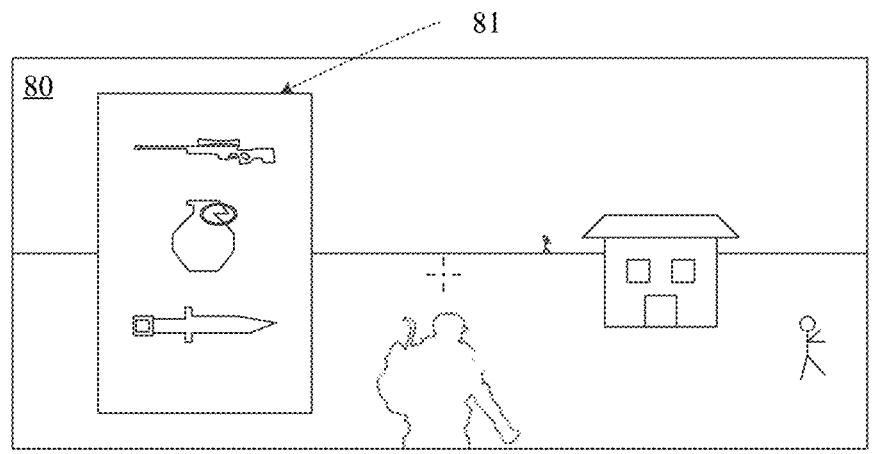
FIG. 8
$$d = \sqrt{(x_1 - x_2)^2 + (y_1 - y_2)^2 + (z_1 - z_2)^2}$$
FIG. 9

METHOD AND APPARATUS FOR DISPLAYING MARKER ELEMENT IN VIRTUAL SCENE, COMPUTER DEVICE, AND COMPUTER-READABLE STORAGE MEDIUM

CROSS-REFERENCE TO RELATED APPLICATIONS

This application is a continuation application of PCT Patent Application No. PCT/CN2019/082200, entitled "METHOD AND DEVICE FOR DISPLAYING MARKER ELEMENTS IN VIRTUAL SCENE, COMPUTER DEVICE, AND COMPUTER-READABLE STORAGE MEDIUM" filed on Apr. 11, 2019, which claims priority to Chinese Patent Application No. 201810480396.2, entitled "METHOD FOR DISPLAYING MARKER ELEMENT IN VIRTUAL SCENE, COMPUTER DEVICE, AND STORAGE MEDIUM" filed May 18, 2018, all of which are incorporated by reference in their entirety.

FIELD OF THE TECHNOLOGY

This application relates to the field of computer application technologies, and in particular, to a method and apparatus for displaying a marker element in a virtual scene, a computer device, and a computer-readable storage medium.

BACKGROUND OF THE DISCLOSURE

A user has a demand for marking a virtual object in a virtual scene in many application programs (for example, a virtual reality application program, a three-dimensional map program, a military simulation program, a first-person shooting game, and a multiplayer online battle arena game) in which virtual scenes are constructed.

In the related art, a target virtual item in the virtual scene may be indicated through a specific interface. For example, in a specific virtual scene, when a virtual object (for example, a game character) that is being controlled by a user currently obtains a virtual prop, "a telescope", a telescope interface may be triggered and opened, and the virtual scene is observed from a viewing angle of the telescope. Moreover, the user may mark a specific virtual object (for example, a building) through a shortcut operation in a scene picture of the virtual scene observed from the viewing angle of the telescope. In this case, a marker element (for example, an arrow) is displayed corresponding to the building in the scene picture of the virtual scene observed from the viewing angle of the telescope. When the user reopens the telescope interface subsequently, and the building exists in the scene picture of the virtual scene observed from the viewing angle of the telescope, the arrow is displayed synchronously corresponding to the building.

SUMMARY

According to embodiments of this application, a method and apparatus for displaying a marker element in a virtual scene, a computer device, and a computer-readable storage medium are provided.

A method for displaying a marker element in a virtual scene is performed by a terminal having a processor and memory storing a plurality of programs to be executed by the processor, the method including:

rendering a display interface of the virtual scene, the virtual scene including a plurality virtual items;

obtaining marker indication information used for indicating a target virtual item, the target virtual item being a virtual item marked by a user of the terminal corresponding to a user account in the virtual scene for user accounts in a same team to view, the user account controlling a current virtual object in the virtual scene;

obtaining graphic data of a marker element according to the marker indication information, the marker element being a graphic element used for indicating a location of the target virtual item in the virtual scene to the user accounts in the same team; and rendering the marker element according to the graphic data at a designated location around the target virtual item in the display interface of the virtual scene.

A terminal, comprising a processor and a memory, the memory storing a plurality of computer-executable instructions, the plurality of computer-executable instructions, when being loaded and executed by the processor, causing the terminal to implement the foregoing method for displaying a marker element in a virtual scene.

A non-transitory computer-readable storage medium, storing a plurality of computer-executable instructions, the plurality of computer-executable instructions, when being loaded and executed by a processor of a terminal, causing the terminal to implement the foregoing method for displaying a marker element in a virtual scene.

Details of one or more embodiments of this application are provided in the accompany drawings and descriptions below. Other features and advantages of this application become more obvious with reference to the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from the accompanying drawings without creative efforts.

FIG. 7 is a schematic diagram of a marking operation included in the embodiment shown in FIG. 6.

FIG. 8 is a schematic diagram of selection of a marker element type included in the embodiment shown in FIG. 6.

FIG. 9 is a schematic diagram of calculation of a straight-line distance included in the embodiment shown in FIG. 6.

DESCRIPTION OF EMBODIMENTS

To make the objectives, technical solutions, and advantages of this application clearer and more comprehensible, this application is further described in detail below with reference to the accompanying drawings and the embodiments. It is to be understood that the specific embodiments described herein are only used for explaining this application, and are not used for limiting this application.

A virtual scene refers to a virtual scene environment generated by using a computer and can provide a multimedia virtual world, and a user may control an operable virtual object in the virtual scene through an operating device or an operation interface, to observe a virtual item, such as things, a character, or scenery, in the virtual scene from a viewing angle of the virtual object, or interact with a virtual item, such as things, a character, or scenery, or another virtual object in the virtual scene through the virtual object, for example, attack a target enemy by operating a virtual soldier.

The virtual scene is generally generated by an application program in a computer device, such as a terminal, and displayed based on hardware (for example, a screen) in the terminal. The terminal may be a mobile terminal such as a smartphone, a tablet computer, or an ebook reader. Alternatively, the terminal may be a personal computer device such as a notebook computer or a fixed computer.

Figure 1A:
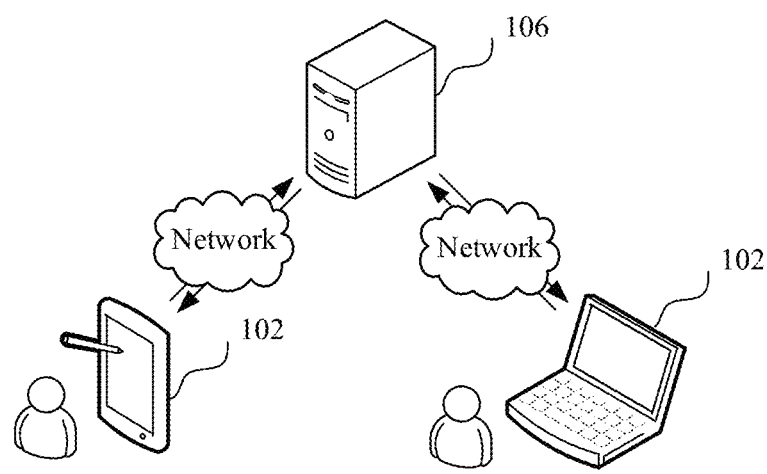
FIG. 1a is an application scenario diagram of a method for displaying a marker element in a virtual scene according to an exemplary embodiment of this application.

A method for displaying a marker element in a virtual scene provided in this application may be applied to an application environment shown in FIG. 1*a*. A first terminal 102 and a second terminal 104 communicate with a server 106 by using a network. The first terminal 102 displays a first display interface, determines a virtual item corresponding to a marking operation as a target virtual item when receiving the marking operation, then transmits a marking request to the server 106, the marking request including an identifier of the target virtual item. The server 106 detects whether a distance between the target virtual item and a current virtual object is less than a visible distance of the current virtual object, and transmits marker indication information to the first terminal 102 and/or the second terminal 104 when the target virtual item is detected to be located within the visible distance of the current virtual object. The first terminal 102 and/or the second terminal 104 obtains graphic data of a marker element according to the marker indication information, obtains the marker element through rendering according to the graphic data, then displays the marker element at a designated location around the target virtual item in a display interface of the virtual scene. In addition, the first terminal 102 and/or the second terminal 104 further obtain(s) distance information, the distance information being used for indicating a distance between the target virtual item and the current virtual object, and displays the distance information at a designated location around the marker element in the display interface of the virtual scene.

The second terminal 104 may be a terminal used by a friend user (for example, a teammate) of a user corresponding to the first terminal 102. The first terminal 102 or the second terminal 104 may be, but is not limited to, a mobile terminal such as a smartphone, a tablet computer, or an ebook reader. Alternatively, the terminal may be a personal computer device such as a notebook computer or a fixed computer. The server 106 may be implemented by an independent server or a server cluster including a plurality of servers respectively.

Figure 1B:
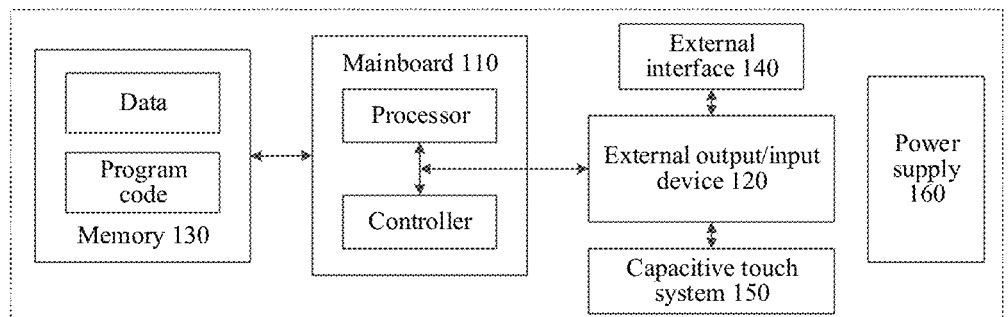
FIG. 1b is a schematic structural diagram of a terminal according to an exemplary embodiment of this application.

FIG. 1*b* is a schematic structural diagram of a terminal according to an exemplary embodiment of this application. As shown in FIG. 1*b*, the terminal includes a mainboard 110, an external output/input device 120, a memory 130, an external interface 140, a capacitive touch system 150, and a power supply 160.

Processing elements, such as a processor and a controller, are integrated in the mainboard 110.

The external output/input device 120 may include a display component (for example, a display screen), a sound playback component (for example, a loudspeaker), a sound collecting component (for example, a microphone), and various types of keys.

The memory 130 stores program code and data.

The external interface 140 may include an earphone interface, a charging interface, a data interface, and the like.

The capacitive touch system 150 may be integrated in the display component or a key of the external output/input device 120, and the capacitive touch system 150 is configured to detect a touch operation performed by the user on the display component or the key.

The power supply 160 is configured to supply power to other components in the terminal.

In an embodiment of this application, the processor in the mainboard 110 may generate a virtual scene by executing or invoking the program code and data stored in the memory, and present the generated virtual scene by using the external output/input device 120. In a process of presenting the virtual scene, a touch operation performed when the user interacts with the virtual scene may be detected by using the capacitive touch system 150.

Figure 2:
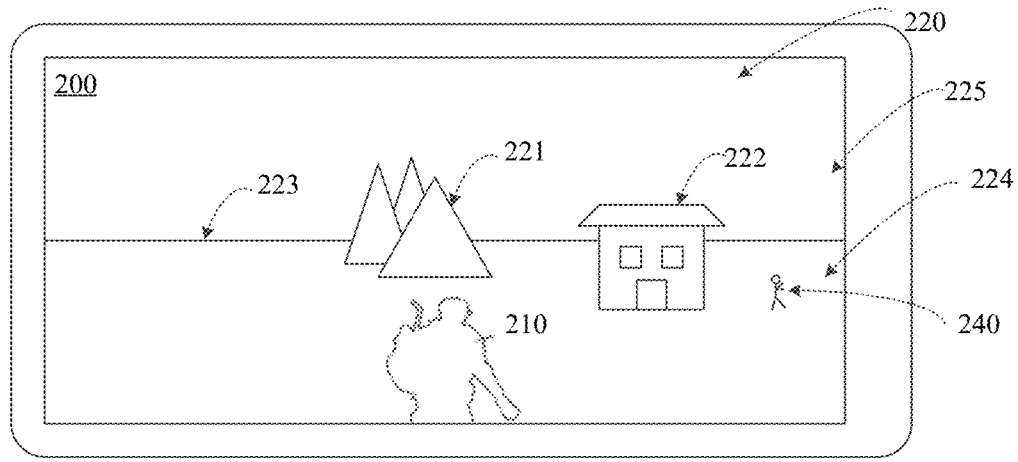
FIG. 2 is a schematic diagram of a scene picture of a virtual scene according to an exemplary embodiment of this application.

The virtual scene may be a three-dimensional virtual scene, or the virtual scene may be a two-dimensional virtual scene. Using an example in which the virtual scene is a three-dimensional virtual scene, FIG. 2 is a schematic diagram of a scene picture of a virtual scene according to an exemplary embodiment of this application. As shown in FIG. 2, a scene picture 200 of the virtual scene includes a virtual object 210, an environment picture 220 of the three-dimensional virtual scene, and a virtual object 240. The virtual object 210 may be a current virtual object of a user corresponding to a terminal, and the virtual object 240 may be a virtual object controlled by a user corresponding to another terminal. The user may control the virtual object 210 to interact with the virtual object 240, for example, control the virtual object 210 to attack the virtual object 240.

In FIG. 2, the virtual object 210 and the virtual object 240 are three-dimensional models in the three-dimensional virtual scene, and the environment picture of the three-dimensional virtual scene displayed in the scene picture 200 includes things observed from a viewing angle of the virtual object 210. For example, as shown in FIG. 2, under the observation from the viewing angle of the virtual object 210, the displayed environment picture 220 of the three-dimensional virtual scene includes the earth 224, the sky 225, the horizon 223, a hill 221, and a factory 222.

The virtual object 210 may move instantly under the control of the user. For example, the user may control the virtual object 210 to move in the virtual scene through an input device such as a keyboard, a mouse, or a gamepad (for example, using an example in which the virtual object 210 is controlled, through a keyboard and a mouse, to move, the user may control, through four keys, namely, the W, A, S, and D keys, in the keyboard, the virtual object to move back and forth and left and right and control, through the mouse, a direction that the virtual object 210 faces); alternatively, if a screen of the terminal supports a touch operation, and the scene picture 200 of the virtual scene includes a virtual control button, when the user touches the virtual control button, the virtual object 210 may move toward a direction of a touch point relative to a center of the virtual control button in the virtual scene.

Figure 3:
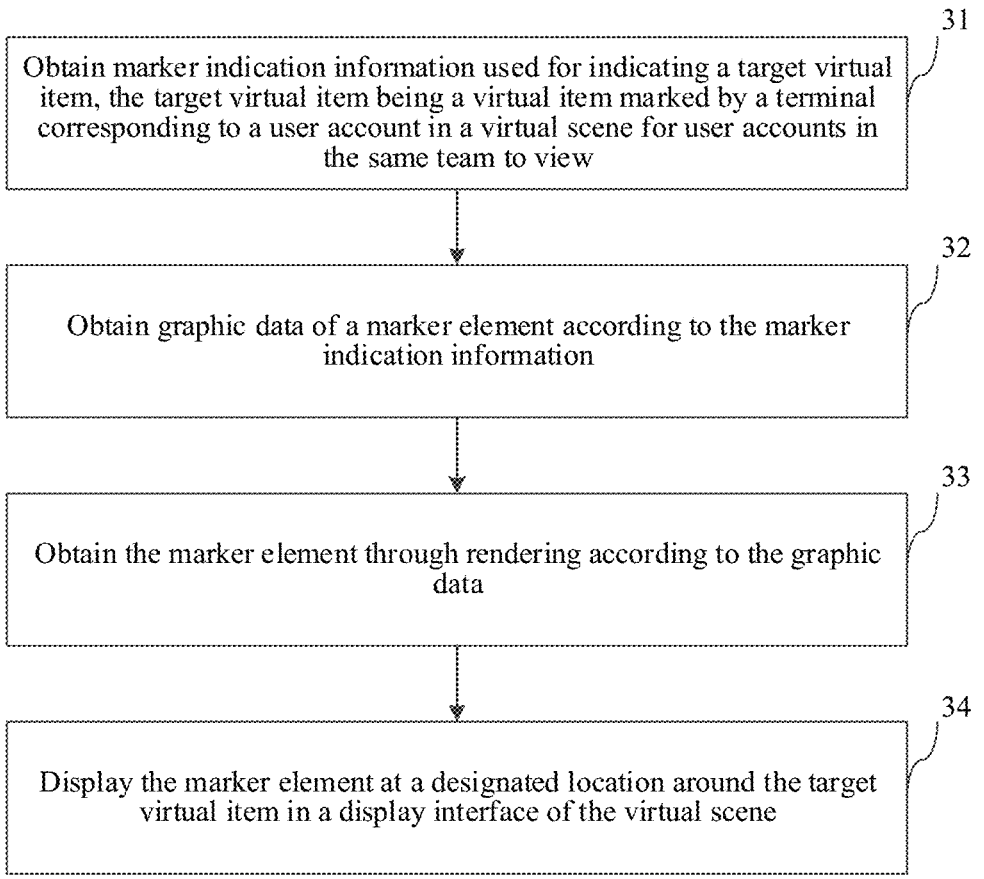
FIG. 3 is a schematic diagram of a procedure for displaying a marker element in a virtual scene according to an exemplary embodiment of this application.

FIG. 3 is a schematic diagram of a procedure for displaying a marker element in a virtual scene according to an exemplary embodiment of this application. As shown in FIG. 3, a terminal (for example, the terminal shown in FIG. 1b) running the application program corresponding to the foregoing virtual scene may perform the following steps to display a marker element corresponding to a target virtual item in a virtual scene.

Step 31. Obtain marker indication information used for indicating a target virtual item, the target virtual item being a virtual item marked by a user of the terminal corresponding to a user account in the virtual scene for user accounts in the same team to view. Before obtaining the marker indication information, the terminal first renders a display interface of a virtual scene, the virtual scene including a plurality virtual items and the plurality of virtual items include the target virtual item. The marker indication information is obtained in response to a user input through the input/output device of the terminal.

The user account may be one of an account controlling a current virtual object or an account controlling another virtual object in the same team in the virtual scene.

In this embodiment of this application, the current virtual object is a virtual object currently controlled by a user account logged in to by the terminal executing this solution. For example, using an example in which the virtual scene is a shooting game scene, the current virtual object may be a virtual soldier located in the game scene and controlled, through a current terminal, by a user corresponding to the terminal.

The target virtual item may be any virtual item allowed to be marked in the virtual scene. For example, the target virtual item may be a scene object in the virtual scene. For example, the scene object may be a ground, a wall, a building, a rock, or a tree. Alternatively, the target virtual item may be a virtual prop in the virtual scene. For example, the virtual prop may be virtual equipment, a virtual vehicle, or the like. Alternatively, the target virtual item may be a virtual character controlled by another player in the virtual scene. For example, the virtual character may be a virtual soldier controlled by an enemy player or a friend player. Alternatively, the target virtual item may be a virtual item controlled by artificial intelligence (AI) in the virtual scene. For example, the virtual item controlled by the AI may be a non-player character (NPC), a monster, or the like in the virtual scene.

Step 32. Obtain graphic data of a marker element according to the marker indication information.

The marker element is a graphic element used for indicating a location of the target virtual item in the virtual scene to the user accounts in the same team.

Step 33. Obtain the marker element through rendering according to the graphic data.

Step 34. Display the marker element at a designated location around the target virtual item in a display interface of the virtual scene.

The display interface of the virtual scene may be used for displaying a picture of the virtual scene observed from a viewing angle direction corresponding to a current virtual object. The viewing angle direction may be a direction in which a virtual object is observed through a camera model in a virtual environment.

Optionally, the camera model automatically follows the virtual object in the virtual environment. That is, when a location of the virtual object in the virtual environment changes, a location of the camera model following the virtual object in the virtual environment changes simultaneously, and the camera model is always within a preset distance range of the virtual object in the virtual environment. Optionally, in an automatic following process, relative locations of the camera model and the virtual object remains unchanged.

Using an example in which the virtual scene is a three-dimensional virtual scene, the camera model is a three-dimensional model located around a virtual object in a virtual environment. When a first-person viewing angle is used, the camera model is located near or at the head of the virtual object. When a third-person viewing angle is used, the camera model may be located behind the virtual object and bound to the virtual object, or may be located at any location away from the virtual object by a preset distance. The virtual object located in the three-dimensional virtual environment may be observed from different angles through the camera model. Optionally, when the third-person viewing angle is a first-person over-shoulder viewing angle, the camera model is located behind the virtual object (for example, the head and the shoulders of the virtual character). For example, in the virtual scene shown in FIG. 2, the scene picture 200 is a picture of the virtual scene observed from the third-person viewing angle of the virtual object 210. Optionally, the camera model is not actually displayed in the three-dimensional virtual environment, that is, the camera model cannot be recognized in the three-dimensional virtual environment displayed in the user interface.

Description is made by using an example in which the camera model is located at any location away from the virtual object by a preset distance. Optionally, one virtual object corresponds to one camera model, and the camera model may rotate with the virtual object as a rotation center, for example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in the embodiments of this application. Optionally, when the camera model observes the virtual object, the viewing angle direction of the camera model is a direction in which a vertical line on a tangent plane of a spherical surface on which the camera model is located points to the virtual object.

Optionally, the camera model may alternatively observe the virtual object at a preset angle in different directions of the virtual object.

Through the solution shown in FIG. 3, when a user account controlling a current virtual object or a user account controlling another virtual object in the same team marks a target virtual item in a virtual scene for user accounts in the same team to view, terminals corresponding to the user accounts in the same team may display a marker element of the target virtual item around the target virtual item in display interfaces of virtual scenes presented by the terminals. That is, in the solution shown in this application, a marker element of a virtual item marked by the user or a teammate is directly displayed in the display interface of the virtual scene, and there is no need for the user to open a specific interface, so that the marker element of the virtual object is displayed more directly without affecting other operations of the user in the virtual scene, thereby improving a display effect of the marker element.

In this embodiment of this application, the terminal may render and display the marker element in a case that the target virtual item is located within a visible distance of the current virtual object.

In a possible implementation, the visible distance of the current virtual object may be a specific preset distance (for example, 500 m) around the current virtual object. To be specific, provided that the distance between the target virtual item and the current virtual object is less than 500 m, the marker element of the target virtual item may be displayed in a virtual scene generated by the terminal. The preset distance may be a distance preset by developers or operation and maintenance personnel.

Figure 4:
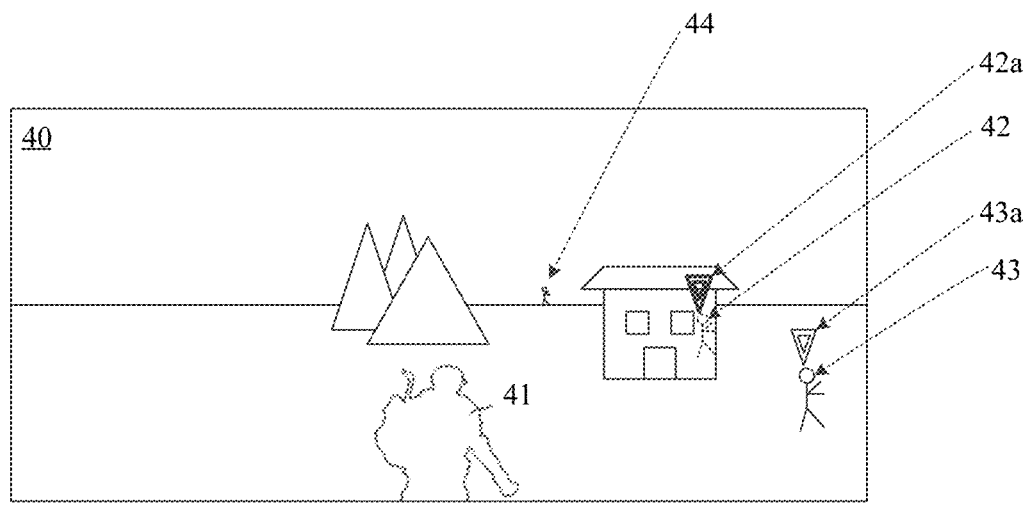
FIG. 4 is a schematic display diagram of a marker element included in the embodiment shown in FIG. 3.

For example, FIG. 4 is a schematic display diagram of a marker element included in an embodiment of this application. As shown in FIG. 4, using an example in which a visible distance of the current virtual object is 500 m, a virtual scene 40 displayed by a terminal includes a current virtual object 41, a target virtual item 42, a target virtual item 43, and a target virtual item 44. A distance between the target virtual item 42 and the current virtual object 41 and a distance between the target virtual item 43 and the current virtual object 41 are less than 500 m, but a distance between the target virtual item 44 and the current virtual object 41 is greater than 500 m, and the target virtual item 42 is obscured by a house 45. In this case, the terminal may display a marker element 42a corresponding to the target virtual item 42, and display a marker element 43a corresponding to the target virtual item 43 without displaying a marker element corresponding to the target virtual item 44. The marker element 42a of the obscured target virtual item 42 may be displayed by highlighting an outline.

Alternatively, in another possible implementation, the visible distance of the current virtual object may be a specific preset distance (for example, 500 m) in an observable picture around the current virtual object. To be specific, provided that the distance between the target virtual item and the current virtual object is less than 500 m, and the target virtual item can be observed directly in the display interface, the marker element of the target virtual item can be displayed in a virtual scene generated by the terminal.

Figure 5:
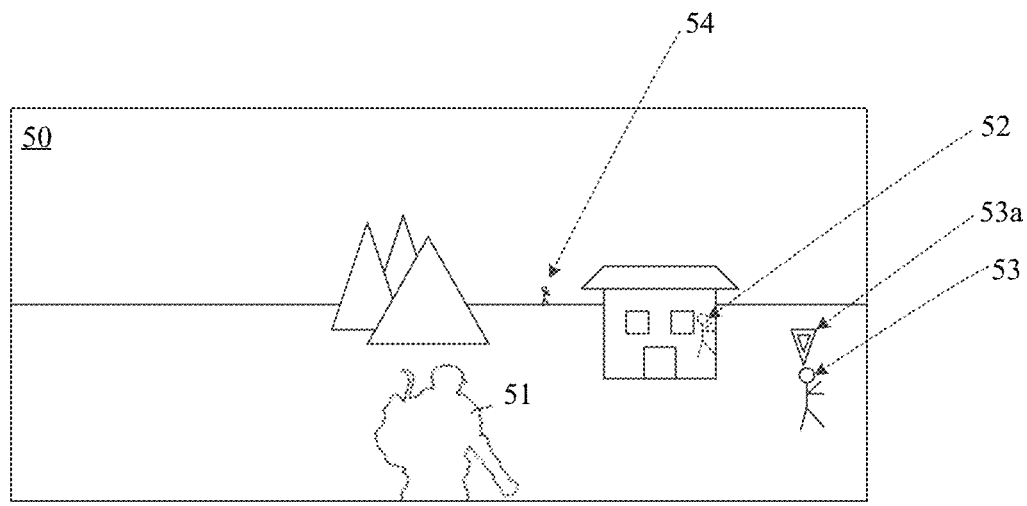
FIG. 5 is a schematic display diagram of another marker element included in the embodiment shown in FIG. 3.

For example, FIG. 5 is a schematic display diagram of another marker element included in an embodiment of this application. As shown in FIG. 5, using an example in which a visible distance of the current virtual object is 500 m that can be observed directly, a virtual scene 50 displayed by a terminal includes a current virtual object 51, a target virtual item 52, a target virtual item 53, and a target virtual item 54. A distance between the target virtual item 52 and the current virtual object 51 and a distance between the target virtual item 53 and the current virtual object 51 are less than 500 m, but a distance between the target virtual item 54 and the current virtual object 51 is greater than 500 m, and the target virtual item 52 is obscured by a house 55. In this case, the terminal may display a marker element 53a corresponding to the target virtual item 53 without displaying marker elements corresponding to the target virtual item 52 and the target virtual item 54.

In a possible implementation, the terminal may only display a marker element of a virtual item that is located within the visible distance of the current virtual object and a duration of being marked is less than a preset duration. When a duration in which a virtual item is marked is greater than a preset duration (for example, 1 minute), the terminal may remove a marker element corresponding to the virtual item from the scene picture.

Optionally, in the embodiments of the present disclosure, the terminal may further obtain distance information (the distance information is used for indicating a distance between the target virtual item and the current virtual object), and display the distance information at a designated location around the marker element in the display interface.

From the perspective of displayed content of an interface of a terminal, according to the solution shown in FIG. 3, the terminal may display a display interface of a virtual scene, and control a motion of the current virtual object in the virtual scene, for example, at least one of movement and rotation; when there is a target virtual item in the display interface, the terminal displays a marker element at a designated location around the target virtual item in the display interface. Optionally, the terminal may further display distance information at a designated location around the marker element in the display interface.

In the solution shown in FIG. 3, the target virtual item may be a virtual object marked by a user corresponding to a user account controlling a current virtual object. Alternatively, the target virtual item may be a virtual object marked by a user (that is, a teammate) corresponding to a user account controlling another virtual object in the same team in the virtual scene. To be specific, when a user is in a team mode, a virtual item marked by the user in a virtual scene may be shared with terminals of teammates for display of a marker element.

In a possible implementation, after a user marks a virtual item through a terminal, a server may synchronize a situation of the marking with a terminal corresponding to another user account in the same team. When synchronizing a marker, the server may receive a marking request including an identifier of a target virtual item, and determine a target terminal in terminals corresponding to user accounts in the same team, the target virtual item being located within a visible distance of a virtual object controlled by a user account corresponding to the target terminal; then, a server transmits marker indication information to the target terminal to instruct the target terminal to obtain graphic data of a marker element, obtain the marker element through rendering according to the graphic data, and display the marker element at a designated location around the target virtual item in a display interface of a virtual scene.

Figure 6:
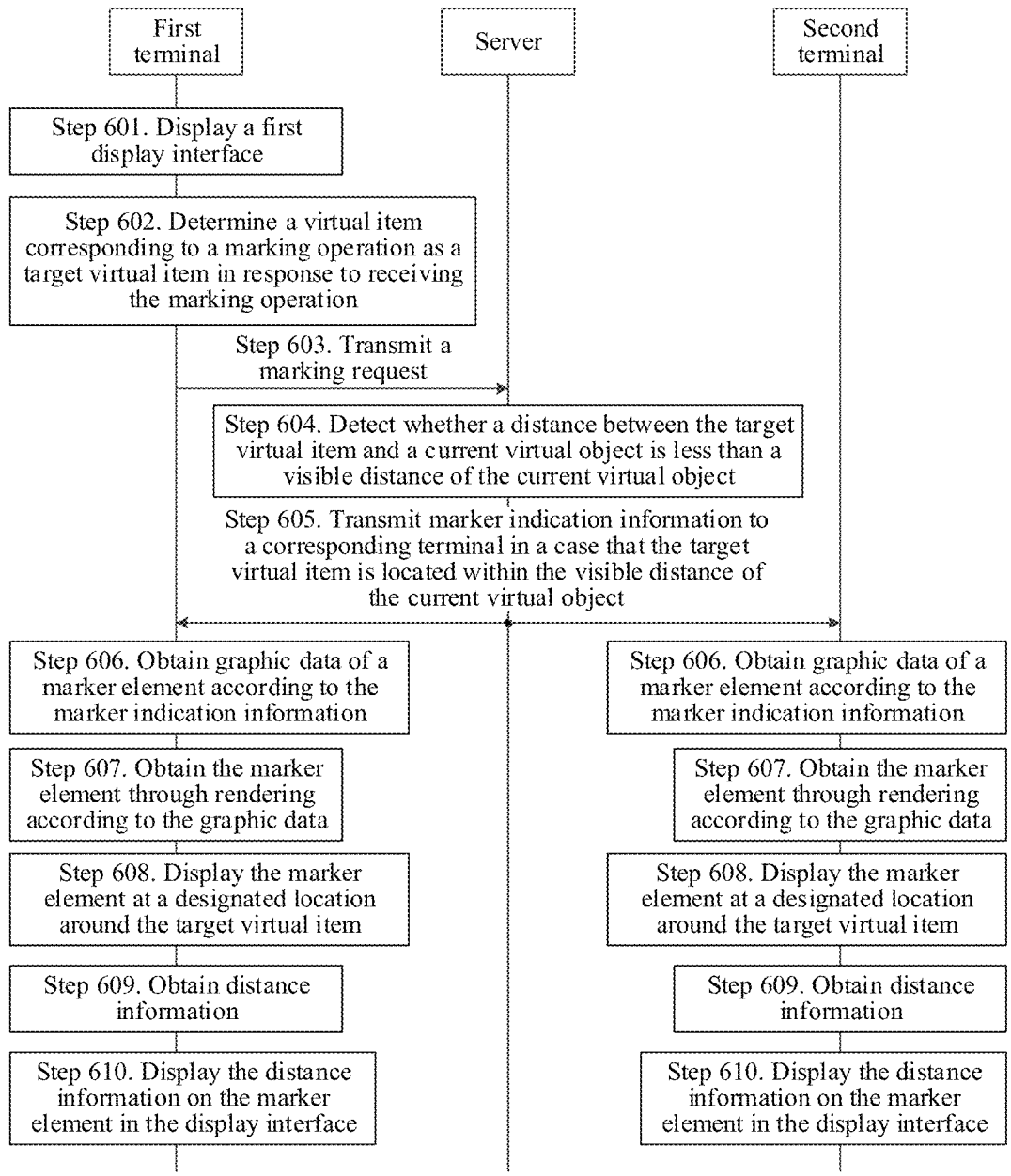
FIG. 6 is a flowchart of a method for displaying a marker element in a virtual scene according to an exemplary embodiment of this application.

FIG. 6 is a flowchart of a method for displaying a marker element in a virtual scene according to an exemplary embodiment of this application. Using an example in which a virtual object marked by a user is synchronized in a team mode to terminals corresponding to users in the same team for display of a marker element in a three-dimensional virtual scene, as shown in FIG. 6, the method for displaying a marker element in a virtual scene may include the following steps.

Step 601. A first terminal displays a first display interface.

The first display interface may display a picture of a virtual scene observed from a viewing angle direction corresponding to a first virtual object. The first virtual object is a current virtual object corresponding to the first terminal.

Step 602. The first terminal determines a virtual item corresponding to a marking operation as a target virtual item in response to receiving the marking operation.

In a possible implementation, the first terminal may display a crosshair icon in a first display interface, the crosshair icon being used for indicating a direction that a current virtual object corresponding to the first terminal faces; when receiving the marking operation, the first terminal may determine a virtual item targeted by the crosshair icon as the target virtual item.

For example, FIG. 7 is a schematic diagram of a marking operation included in an embodiment of this application. As shown in FIG. 7, a virtual scene 70 displayed by a terminal includes a current virtual object 71 and a crosshair icon 72 corresponding to the current virtual object 71, the crosshair icon 72 indicating a direction that the current virtual object 71 faces. In a shooting game scene, the crosshair icon 72 may alternatively indicate a direction targeted by a weapon held by the current virtual object 71, and when a user wants to mark a virtual object, for example, mark a ground, the user may adjust a viewing angle of a character to enable the crosshair icon 72 to aim at the ground, and perform a shortcut operation (that is, the marking operation), for example, press a Q shortcut key, so that the first terminal receives the marking operation of the user on the ground.

In a possible implementation, the first terminal may alternatively present a marker type selection interface when receiving the marking operation, the marker type selection interface including at least two marker options, each marker option corresponding to one marker type; and determine a target marker type when receiving a selection operation performed in the marker type selection interface, the target marker type being a marker type of a marker option corresponding to the selection operation.

In this embodiment of this application, a person that performs marking may alternatively select a type of a marker element of a target virtual item, for example, may select a color, a shape, and the like of the marker element of the target virtual item. For example, FIG. 8 is a schematic diagram of selection of a marker element type included in an embodiment of this application. As shown in FIG. 8, in a virtual scene 80 displayed by a terminal, after a user performs a marking operation (for example, presses a Q shortcut key), the terminal displays a marker type selection interface 81 on an upper layer of the virtual scene 80, the marker type selection interface 81 includes several marker options, each marker option corresponding to one type of a marker element. For example, in FIG. 8, marker options included in the marker type selection interface 81 may include an option corresponding to a marker element in a shape of a gun, an option corresponding to a marker element in a shape of a hand grenade, an option corresponding to a marker element in a shape of a dagger, and the like. The user selects, through a selection operation, for example, clicking with a mouse, tapping, or pressing a shortcut key (for example, pressing a number key, or switching through a Tab key while pressing and holding a Q key), or another operation, a type of a marker element that needs to be set. After receiving the selection operation of the user, the terminal determines a type corresponding to the selection operation is a shape type (that is, the target marker type) of a target virtual item.

Step 603. The first terminal transmits a marking request to a server, the marking request including an identifier of the target virtual item.

After receiving the marking operation, the first terminal may transmit a request including the identifier of the target virtual item to the server, the identifier of the target virtual item may be a unique identity (ID) of the target virtual item in a virtual scene. Alternatively, the identifier of the target virtual item may be coordinates of the target virtual item in the current virtual scene. A specific form of the identifier of the target virtual item is not limited in the embodiments of this application.

Optionally, a user corresponding to the first terminal further selects a target marker type of the target virtual item when marking the virtual object, and the first terminal may transmit the marking request including the identifier the target virtual item and the target marker type to the server.

Step 604. The server detects whether a distance between the target virtual item and a current virtual object is less than a visible distance of the current virtual object.

The server may detect whether a distance between the target virtual item and a first virtual object (that is, a current controlled object corresponding to the first terminal) is less than a visible distance of the first virtual object, and detect whether a distance between the target virtual item and a second virtual object (that is, a current controlled object corresponding to the second terminal) is less than a visible distance of the second virtual object.

In this embodiment of this application, the second terminal may be a terminal used by a friend user (for example, a teammate) of a user corresponding to the first terminal. When receiving the marking request transmitted by the first terminal, the server may first obtain coordinates of the first virtual object in the virtual scene and coordinates of the target virtual item in the virtual scene, and calculate a distance between the first virtual object and the target virtual item in the virtual scene according to the coordinates of the two. After calculating the distance between the first virtual object and the target virtual item in the virtual scene, the server further compares the distance between the first virtual object and the target virtual item in the virtual scene with the visible distance of the first virtual object, to detect whether the distance between the first virtual object and the target virtual item is less than the visible distance of the first virtual object.

In addition, the server may detect whether a virtual object (that is, the second virtual object) currently controlled by a teammate of the user corresponding to the first terminal is alive, and if the second virtual object is alive, the server further obtains coordinates of the living second virtual object in the virtual scene, and calculates a distance between the second virtual object and the target virtual item in the virtual scene. After calculating the distance between the second virtual object and the target virtual item in the virtual scene, the server further compares the distance between the second virtual object and the target virtual item in the virtual scene with the visible distance of the second virtual object, to detect whether the distance between the second virtual object and the target virtual item is less than the visible distance of the second virtual object.

A distance between the target virtual item and a current virtual object of the first terminal or a distance between the target virtual item and a current virtual object of the second terminal may be a straight-line distance (or may be referred to as a space distance or a three-dimensional space distance) in the virtual scene. For example, FIG. 9 is a schematic diagram of calculation of a straight-line distance included in an embodiment of this application. As shown in FIG. 9, assuming that coordinates of a current virtual object in the virtual scene is $(x_1, y_1, z_1)$ and coordinates of a target virtual item in the virtual scene is $(x_2, y_2, z_2)$, in the virtual scene, a distance between the current virtual object and the target virtual item may be represented as:

$$d=\sqrt{(x_1-x_2)^2+(y_1-y_2)^2+(z_1-z_2)^2}$$

$$d=\sqrt{(x_1-x_2)^2+(y_1-y_2)^2+(z_1-z_2)^2}$$

where a unit of d may be meter (m).

Through the foregoing step 604, the server may determine a target terminal from terminals corresponding to user accounts in the same team. For example, an example in which the terminals corresponding to the user accounts in the same team include the foregoing first terminal and the second terminal is used. If the target virtual item is located within a visible distance of a current virtual object corresponding to the first terminal, the first terminal is the target terminal; if the target virtual item is less than a visible distance of a current virtual object corresponding to the second terminal, the second terminal is the target terminal; if the target virtual item is located within both the visible distance of the current virtual object corresponding to the first terminal and the visible distance of the current virtual object corresponding to the second terminal, both the first terminal and the second terminal are the target terminals.

Step 605. The server transmits marker indication information to a corresponding terminal in a case that the target virtual item is detected to be located within the visible distance of the current virtual object, the first terminal and/or the second terminal receiving the marker indication information.

The marker indication information is used for indicating the target virtual item.

The server may transmit the marker indication information to a target terminal in the first terminal and the second terminal. For example, when the distance between the target virtual item and the first virtual object is detected to be less than the visible distance of the first virtual object, the server may transmit first marker indication information to the first terminal. Correspondingly, when the distance between the target virtual item and the second virtual object is less than the visible distance of the second virtual object, the server may transmit second marker indication information to the second terminal. Correspondingly, the first terminal/the second terminal (that is, the foregoing target terminal) receives the foregoing marker indication information transmitted by the server.

Optionally, when the marking request transmitted by the first terminal to the server includes a target marker type of the target virtual item, the server may transmit marker indication information including the target marker type to the target terminal.

Alternatively, the server may transmit the target marker type to the target terminal through indication information in addition to the marker indication information.

Optionally, the server may transmit only the target marker type to the second terminal. That is, the foregoing second marker indication information includes the target marker type, while the foregoing first marker indication information may not include the target marker type.

Step 606. The first terminal/the second terminal obtains graphic data of a marker element according to the marker indication information.

The marker element is a graphic element used for indicating a location of the target virtual item in the virtual scene to the user accounts in the same team.

Optionally, when the marker indication information includes the target marker type, after receiving the marker indication information, the first terminal/the second terminal may obtain graphic data of a marker element according to the target marker type.

For example, if a user corresponding to the first terminal selects the option corresponding to the marker element in a shape of a gun in the interface shown in FIG. 8, in this step, the first terminal and/or the second terminal may obtain a marker element in a shape of a gun correspondingly.

Optionally, the foregoing marker indication information may further include object indication information, the object indication information being used for indicating a virtual object (that is, the foregoing first virtual object) controlled by a user account corresponding to a terminal (that is, the foregoing first terminal) marking the target virtual item; and the first terminal/the second terminal may obtain graphic data corresponding to the virtual object indicated by the object indication information.

In this embodiment of this application, for target virtual items marked by different users in the same team, the terminals may display different marker elements. For example, in a possible implementation, marker elements of target virtual items marked by different users in the same team may be distinguished through different colors, so that the users can quickly distinguish a specific teammate that marks the target virtual item.

Step 607. The first terminal and/or the second terminal obtain(s) the marker element through rendering according to the foregoing graphic data.

The first terminal and/or the second terminal may perform rendering locally according to the obtained graphic data respectively to obtain a marker element corresponding to the target virtual item.

Step 608. The first terminal and/or the second terminal display(s) the marker element at a designated location around the target virtual item in a display interface of the virtual scene.

In this embodiment of this application, after obtaining the marker element corresponding to the target virtual item through rendering, the first terminal and/or the second terminal may display the marker element at a location of the target virtual item correspondingly in the virtual scene, for example, may display the marker element at a location above the target virtual item and near the target virtual item.

Step 609. The first terminal and/or the second terminal obtain(s) distance information.

The distance information is used for indicating a distance between the target virtual item and the current virtual object.

In this embodiment of this application, the distance information may be transmitted to the first terminal and/or the second terminal through the server. For example, in the foregoing step 604, when the server detects whether the target virtual item is located within the visible distance of the current virtual object corresponding to the first terminal and the visible distance of the current virtual object corresponding to the second terminal, a distance between the target virtual item and the current virtual object corresponding to the first terminal and a distance between the target virtual item and the current virtual object corresponding to the second terminal need to be calculated. In step 605, when the server detects that the target virtual item is located within a visible distance of a current virtual object of a terminal, a marker element display instruction transmitted by the server to the corresponding terminal may carry information about a distance between the target virtual item and the corresponding terminal, and the corresponding terminal may obtain the distance information from the marker element display instruction.

Alternatively, in another possible implementation, when obtaining distance information, the first terminal and/or the second terminal may alternatively obtain coordinates of the target virtual item in the virtual scene autonomously, and locally calculate information about a distance between the current virtual object and the target virtual item according to the coordinates of the current virtual object and the coordinates of the target virtual item in the virtual scene.

Step 610. The first terminal and/or the second terminal display(s) the distance information at a designated location around the marker element in the display interface of the virtual scene.

The first terminal displays the information about a distance between the first virtual object and the target virtual item corresponding to the marker element in the first display interface. Correspondingly, the second terminal displays the information about a distance between the second virtual object and the target virtual item corresponding to the marker element in a second display interface. The second display interface may display a picture of a virtual scene observed from a viewing angle direction corresponding to the second virtual object.

In this embodiment of this application, the first terminal and/or the second terminal may display the distance information at a designated location around the marker element. For example, the first terminal and/or the second terminal may display the distance information as a document at a designated location around the marker element of the target virtual item.

The designated location around the marker element may be tightly next to the left, the right, the top, or the bottom of the marker element.

Figure 10:
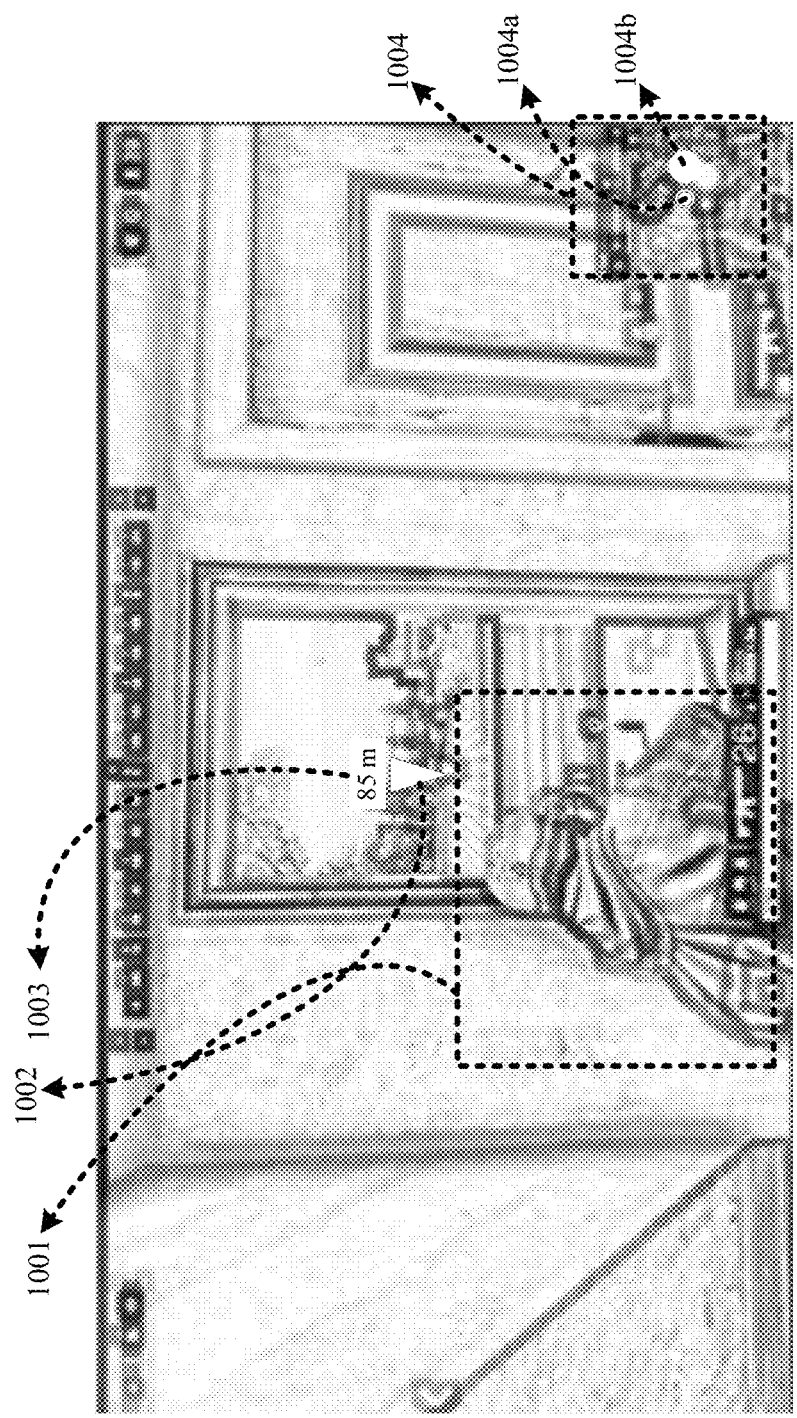
FIG. 10 is a schematic display diagram of distance information included in the embodiment shown in FIG. 6.

For example, FIG. 10 is a schematic display diagram of distance information included in an embodiment of this application. As shown in FIG. 10, a virtual scene 100 displayed by a terminal includes a current virtual object 1001, and a marker element 1002 (that is, an inverted triangular icon in FIG. 10) of the virtual object. A display box 1003 is further displayed on the top and tightly next to the marker element 1002, and value text (which is 85 m shown in FIG. 10) of a distance between a virtual object corresponding to the marker element 1002 and the current virtual object 1001 is displayed in the display box 1003.

In another possible implementation, in a case that the terminal displays distance information corresponding to the marker element, the distance information may be displayed at a designated location around the marker element in a graph form in a scene picture of the virtual scene.

Figure 11:
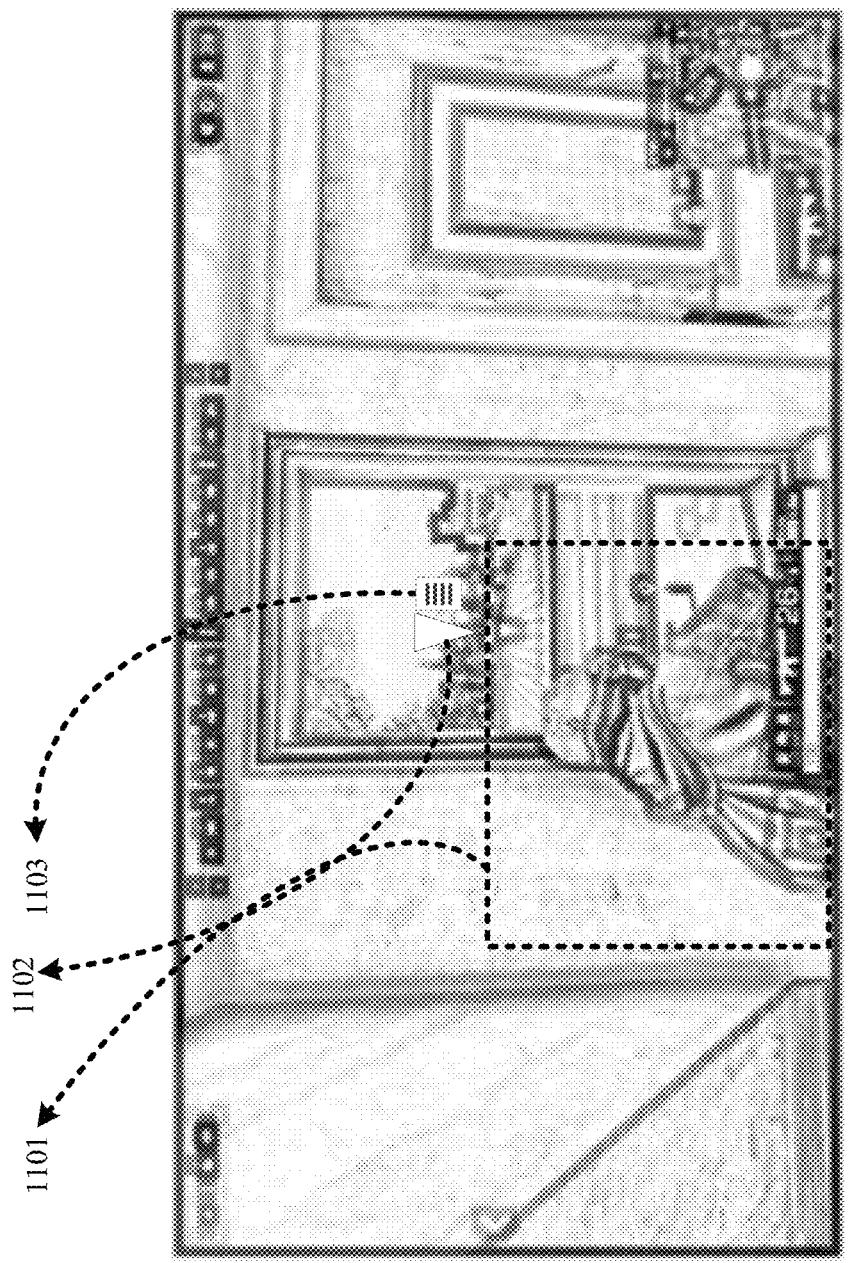
FIG. 11 is a schematic display diagram of another type of distance information included in the embodiment shown in FIG. 6.

For example, FIG. 11 is a schematic display diagram of another type of distance information included in an embodiment of this application. As shown in FIG. 11, a virtual scene 110 displayed by a terminal includes a current virtual object 1101, and a marker element 1102 (that is, an inverted triangular icon in FIG. 11) of the virtual object. A distance indication graph 1103 is further displayed on the right and tightly next to the marker element 1102, the distance indication graph 1103 is formed by one or more horizontal bars, and a quantity of the horizontal bars in the distance indication graph 1103 indicates a distance between a corresponding virtual object and the current virtual object 1101. For example, a larger quantity of the horizontal bars in the distance indication graph 1103 indicates a larger distance between the virtual object and the current virtual object 1101.

Optionally, the distance information includes at least one type of the following information: a straight-line distance between the target virtual item and the current virtual object; a horizontal distance between the target virtual item and the current virtual object; and a height difference between the target virtual item and the current virtual object.

In this embodiment of this application, in a case that the virtual scene is a three-dimensional virtual scene, the distance between the target virtual item and the current virtual object displayed by the terminal may be a horizontal distance, a three-dimensional space distance, a height difference, or any two or all of the foregoing three. For example, in FIG. 10, a distance value displayed in the display box 1003 may be the horizontal distance between the target virtual item and the current virtual object, or may be the three-dimensional space distance between the target virtual item and the current virtual object.

Figure 12:
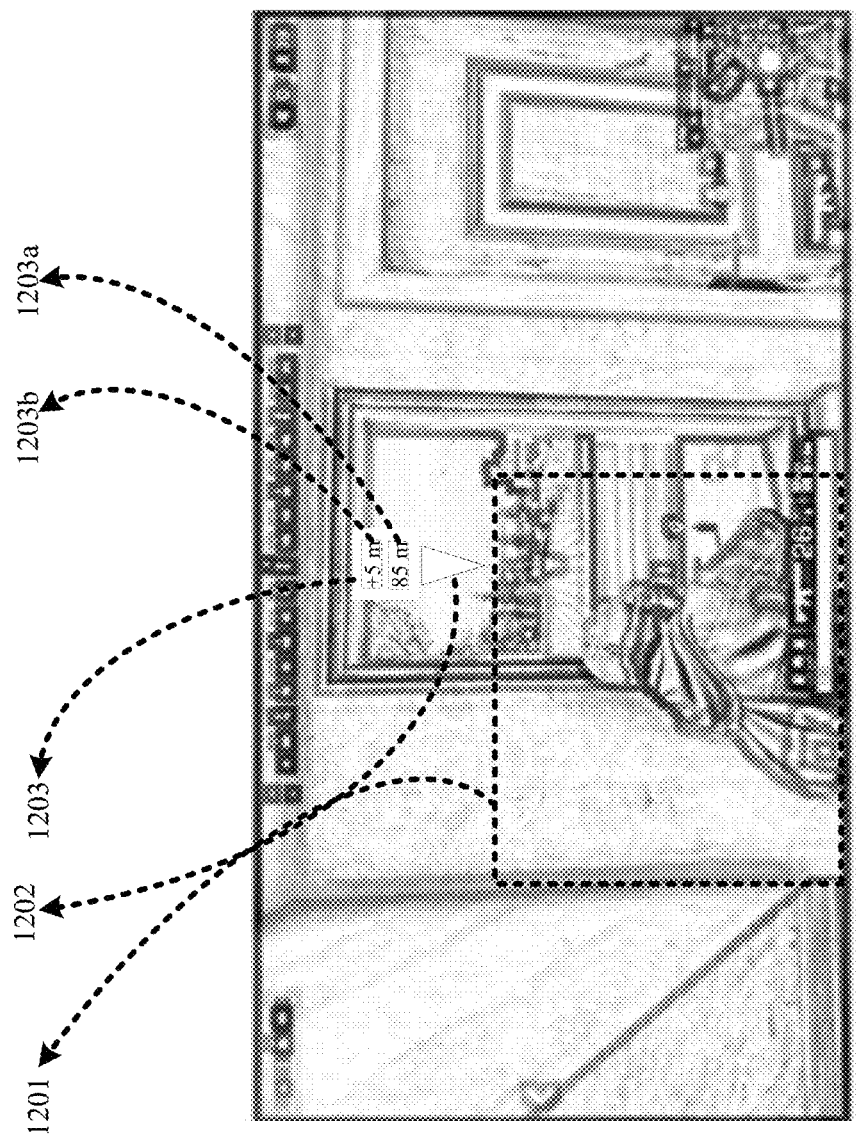
FIG. 12 is a schematic display diagram of still another type of distance information included in the embodiment shown in FIG. 6.

For example, FIG. 12 is a schematic display diagram of still another type of distance information included in an embodiment of this application. An example in which the distance between the target virtual item and the current virtual object displayed by the terminal is the horizontal distance and the height difference is used. As shown in FIG. 12, a virtual scene 120 displayed by a terminal includes a current virtual object 1201 and a marker element 1202 (that is, an inverted triangular icon in FIG. 12) of the virtual object. A display box 1203 is further displayed on the top and tightly next to the marker element 1202, and value text 1203a (which is 85 m shown in FIG. 12) of a horizontal distance between a virtual object corresponding to the marker element 1202 and the current virtual object 1201 and value text 1203b (which is +5 m shown in FIG. 12, where "+" represents that a height of the virtual object corresponding to the marker element 1202 is higher than a height of the current virtual object 1201, and correspondingly, if the height of the virtual object corresponding to the marker element 1202 is lower than the height of the current virtual object 1201, a symbol of the value text 1203b may be "−") of a height difference between the virtual object corresponding to the marker element 1202 and the current virtual object 1201 are displayed in the display box 1203.

Optionally, in this embodiment of this application, the display interface further includes a thumbnail map of the virtual scene; and the first terminal and/or the second terminal further display(s) a marker icon of the target virtual item in the thumbnail map corresponding to a location of the target virtual item in the thumbnail map of the virtual scene.

For example, in FIG. 10, the virtual scene 100 displayed by the terminal further includes a thumbnail map 1004, the thumbnail map 1004 including an icon 1004a corresponding to the current virtual object 1001 and a marker icon 1004b of the target virtual item.

Optionally, in this embodiment of this application, in a case that a timing duration of a first timer reaches a first preset duration, the server may transmit marker cancellation information to the first terminal and/or the second terminal (that is, a target terminal) that receive(s) the marker indication information before; and the first timer is a timer started at a moment at which the target virtual item is marked and having the first preset duration as a timing duration. After receiving the marker cancellation information, the first terminal and/or the second terminal may remove a corresponding marker element from the display interface of the virtual scene.

Alternatively, in another possible implementation, the target terminal may remove the marker element from the display interface of the virtual scene in a case that a timing duration of a second timer reaches a second preset duration; and the second timer is a timer started at a moment at which the marker element is displayed by the target terminal and having the second preset duration as a timing duration.

For example, in this embodiment of this application, after receiving the marker indication information transmitted by the server and displaying the marker element according to the marker indication information, the first terminal and/or the second terminal start(s) a timer to start timing, and cancels display of the marker element when the timing duration reaches a specific duration (for example, 2 min).

The timer started by the terminal may be started by the terminal through a notification of the server. For example, the marker indication information may carry the second preset duration, and after receiving the marker indication information and displaying the marker element, the terminal starts the timer according to the second preset duration.

The first preset duration or the second preset duration may be a duration preset in a system by developers or operation and maintenance personnel. Alternatively, the first preset duration or the second preset duration may be a duration set by a person marking the target virtual item.

To sum up, according to the solution shown in the embodiments of this application, in a virtual scene, when a terminal of a user account controlling a current virtual object or a terminal of a user account controlling another virtual object in the same team marks a target virtual item in the virtual scene for user accounts in the same team to view, terminals corresponding to the user accounts in the same team may display a marker element of the target virtual item around the target virtual item in display interfaces of virtual scenes presented by the terminals. That is, in the solution shown in this application, a marker element of a virtual item marked by the user or a teammate is directly displayed in the display interface of the virtual scene, and there is no need for the user to open a specific interface, so that the marker element of the virtual object is displayed more directly without affecting other operations of the user in the virtual scene, thereby improving a display effect of the marker element.

Figure 13:
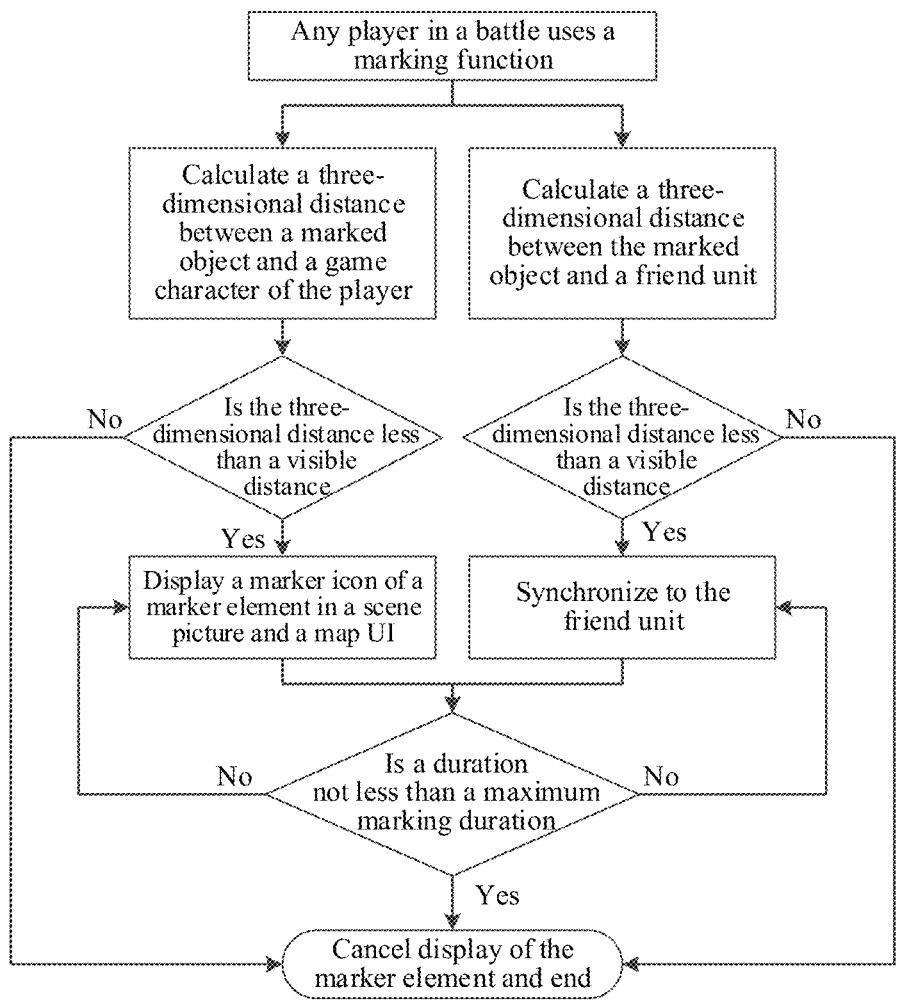
FIG. 13 is a flowchart of displaying a marker element according to an exemplary embodiment of this application.

An example in which the solution shown in FIG. 3 or FIG. 6 is applied to a specific game scene is used. FIG. 13 is a flowchart of displaying a marker element according to an exemplary embodiment of this application. As shown in FIG. 13, in a shooting battle arena game scene, after any player in a battle uses a marking function, a terminal of the player transmits an identifier of a marked object (that is, a target virtual item) corresponding to the marking function to a server, the server calculates a three-dimensional distance between the marked object and a game character of the player according to the identifier of the marked object, determines whether the three-dimensional distance is less a visible distance of the game character of the player, and if yes, instructs the terminal of the player to display a marker icon of a marker element of the marked object in a scene picture and a map user interface (UI) of the virtual scene. In addition, the server further calculates a three-dimensional distance between the marked object and a friend unit (that is, a game character of a teammate of the player), determines whether the three-dimensional distance is less than a visible distance of the friend unit, and if yes, synchronizes the marker element to the friend unit, to be specific, instructs a terminal corresponding to the friend unit to display the marker icon of the marker element of the marked object in the scene picture and the map UI of the virtual scene. Then, the server periodically determines whether a duration of the marker element is not less than a maximum marking duration, if the duration of the marker element is determined to be not less than the maximum marking duration, the server instructs each terminal to cancel display of the marker element. Otherwise, if the duration of the marker element is determined to be less than the maximum marking duration, the terminal is allowed to display the marker element.

It is to be understood that, although steps in the flowcharts of FIG. 3 or FIG. 6 are displayed sequentially according to indications of arrows, the steps are not necessarily performed according to an order indicated by the arrows. Unless explicitly specified in this application, the sequence of the steps is not strictly limited, and the steps may be performed in other sequences. In addition, at least some steps in FIG. 3 or FIG. 6 may include a plurality of substeps or a plurality of stages. The substeps or the stages are not necessarily performed at the same moment, and instead may be performed at different moments. The substeps or the stages is not necessarily performed sequentially, and instead may be performed in turn or alternately with another step or at least some of substeps or stages of another step.

Figure 14:
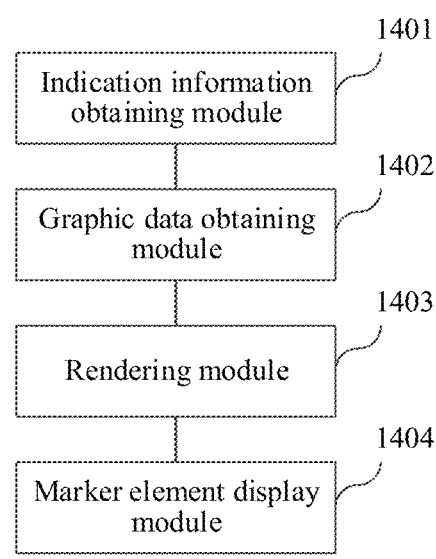
FIG. 14 is a schematic block diagram of an apparatus for displaying a marker element in a virtual scene according to an exemplary embodiment of this application.

FIG. 14 is a schematic block diagram of an apparatus for displaying a marker element in a virtual scene according to an exemplary embodiment of this application. The apparatus for displaying a marker element in a virtual scene may be used in a terminal to perform all or some steps performed by a terminal in the method shown in the embodiment corresponding to FIG. 3 or FIG. 6. The apparatus for displaying a marker element in a virtual scene may include:

an indication information obtaining module 1401, configured to obtain marker indication information used for indicating a target virtual item, the target virtual item being a virtual item marked by a terminal corresponding to a user account in the virtual scene for user accounts in the same team to view, the user account being an account controlling a current virtual object or an account controlling another virtual object in the same team in the virtual scene;

a graphic data obtaining module 1402, configured to obtain graphic data of a marker element according to the marker indication information, the marker element being a graphic element used for indicating a location of the target virtual item in the virtual scene to the user accounts in the same team;

a rendering module 1403, configured to obtain the marker element through rendering according to the graphic data; and a marker element display module 1404, configured to display the marker element at a designated location around the target virtual item in a display interface of the virtual scene.

Optionally, the apparatus further includes:

a distance information obtaining module, configured to obtain distance information, the distance information being used for indicating a distance between the target virtual item and the current virtual object; and a distance information display module, configured to display the distance information at a designated location around the marker element in the display interface.

Optionally, the distance information includes at least one type of the following information:

a straight-line distance between the target virtual item and the current virtual object;

a horizontal distance between the target virtual item and the current virtual object; and a height difference between the target virtual item and the current virtual object.

Optionally, the apparatus further includes:

a marker icon display module, configured to display a marker icon of the target virtual item in a thumbnail map corresponding to a location of the target virtual item in the thumbnail map.

Optionally, the indication information obtaining module 1401 is specifically configured to receive the marker indication information transmitted by a server in a case that the target virtual item is detected to be located within a visible distance of the current virtual object.

Optionally, the apparatus further includes:

a crosshair icon display module, configured to display a crosshair icon in the display interface, the crosshair icon being used for indicating a direction that the current virtual object faces;

an object determining module, configured to determine a virtual item targeted by the crosshair icon as the target virtual item in a case that a marking operation is received and the user account is an account controlling the current virtual object in the virtual scene; and a request transmitting module, configured to transmit a marking request to the server, the marking request including an identifier of the target virtual item.

Optionally, the apparatus further includes:

an interface display module, configured to present a marker type selection interface in a case that the marking operation is received, the marker type selection interface including at least two marker options, each marker option corresponding to one marker type; and a type determining module, configured to determine a target marker type in a case that a selection operation performed in the marker type selection interface is received, the target marker type being a marker type of a marker option corresponding to the selection operation, the request transmitting module being specifically configured to transmit the marking request including the identifier of the target virtual item and the target marker type to the server.

Optionally, the marker indication information includes a target marker type.

The graphic data obtaining module 1402 is specifically configured to obtain the graphic data of the marker element according to the target marker type.

Optionally, the marker indication information includes object indication information, the object indication information being used for indicating a virtual object controlled by the user account corresponding to the terminal marking the target virtual item.

The graphic data obtaining module 1402 is specifically configured to obtain the graphic data corresponding to the virtual object indicated by the object indication information.

Optionally, the apparatus further includes:

a cancellation information receiving module, configured to receive marker cancellation information, the marker cancellation information being information transmitted by the server after a timing duration of a first timer reaches a first preset duration, the first timer being started at a moment at which the target virtual item is marked; and a first removing module, configured to remove the marker element from the display interface.

Optionally, the apparatus further includes:

a second removing module, configured to remove the marker element from the display interface of the virtual scene in a case that a timing duration of a second timer reaches a second preset duration, the second timer being started at a moment at which the marker element is displayed.

Figure 15:
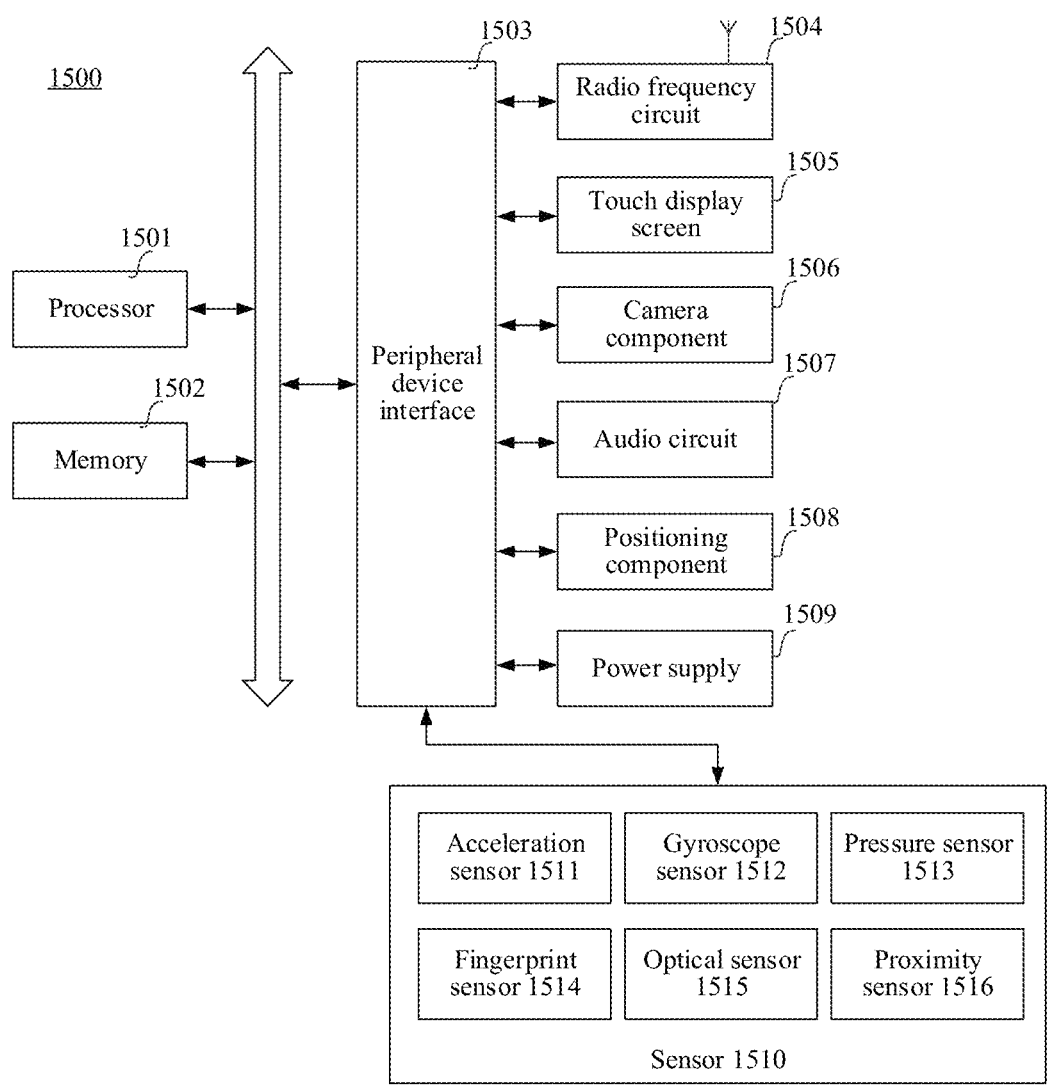
FIG. 15 is a structural block diagram of a computer device according to an exemplary embodiment of this application.

FIG. 15 is a structural block diagram of a computer device 1500 according to an exemplary embodiment. The computer device 1500 may be a user terminal, such as a smartphone, a tablet computer, a moving picture experts group audio layer III (MP3) player, a moving picture experts group audio layer IV (MP4) player, a notebook computer, or a desktop computer. The computer device 1500 may be further referred to as another name such as user equipment, a portable terminal, a laptop terminal, or a desktop terminal.

Generally, the computer device 1500 includes a processor 1501 and a memory 1502. The memory stores at least one instruction, at least one program, a code set, or an instruction set, the at least one instruction, the at least one program, the code set, or the instruction set being loaded and executed by a processor to implement all or some steps in the method for displaying a marker element in a virtual scene shown in the embodiment corresponding to FIG. 3 or FIG. 6.

The processor 1501 may include one or more processing cores, for example, may be a 4-core processor or an 8-core processor. The processor 1501 may be implemented in at least one hardware form of digital signal processing (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1501 may be integrated with a graphics processing unit (GPU). The GPU is configured to be responsible for rendering and depicting content that a display screen needs to display. In some embodiments, the processor 1501 may further include an artificial intelligence (AI) processor. The AI processor is configured to process a calculation operation related to machine learning.

The memory 1502 may include one or more computer-readable storage media. The computer-readable storage medium may be non-transient. The memory 1502 may further include a high-speed random access memory, and a non-volatile memory such as one or more magnetic disk storage devices and a flash storage device. In some embodiments, the non-transient computer-readable storage medium in the memory 1502 is configured to store at least one instruction, the at least one instruction being executed by the processor 1501 to implement the method for displaying a marker element in a virtual scene provided in the method embodiment of this application.

In some embodiments, the computer device 1500 further optionally includes a peripheral device interface 1503 and at least one peripheral device. The processor 1501, the memory 1502 and the peripheral device interface 1503 may be connected by a bus or a signal line. Each peripheral device may be connected to the peripheral device interface 1503 by the bus, the signal line, or a circuit board. Specifically, the peripheral device includes: at least one of a radio frequency (RF) circuit 1504, a touch display screen 1505, a camera component 1506, an audio circuit 1507, a positioning component 1508, and a power supply 1509.

In some embodiments, the computer device 1500 further includes one or more sensors 1510. The one or more sensors 1510 include, but are not limited to, an acceleration sensor 1511, a gyroscope sensor 1512, a pressure sensor 1513, a fingerprint sensor 1514, an optical sensor 1515, and a proximity sensor 1516.

A person skilled in the art may understand that a structure shown in FIG. 15 constitutes no limitation on the computer device 1500, and the computer device may include more or fewer components than those shown in the figure, or some components may be combined, or a different component deployment may be used.

In an exemplary embodiment, a non-temporary computer-readable storage medium including an instruction is further provided, for example, a memory includes at least one instruction, at least one program, a code set, or an instruction set. The at least one instruction, the at least one program, the code set, or the instruction set may be executed by a processor to implement all or some steps in the method for displaying a marker element in a virtual scene shown in the embodiment corresponding to FIG. 3 or FIG. 6.

A person of ordinary skill in the art may understand that all or some of the procedures of the methods in the foregoing embodiments may be implemented by instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

After considering the specification and implementing the present disclosure, a person skilled in the art can readily think of other implementations of this application. This application is intended to cover any variation, use, or adaptive change of this application. The variations, uses, or adaptive changes follow the general principles of this application and include common general knowledge or common technical means in the art that are not disclosed in this application. The specification and the embodiments are merely considered as examples, and the actual scope and the spirit of this application are pointed out by the following claims.

It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A method for displaying a marker element in a virtual scene, performed by a terminal having a processor and memory storing a plurality of programs to be executed by the processor, the method comprising:
    rendering a display interface of the virtual scene, the virtual scene including a plurality of virtual items;
    obtaining marker indication information used for indicating a target virtual item, the target virtual item being a virtual item marked by a user of the terminal corresponding to a user account in the virtual scene for user accounts in a same team to view, the user account controlling a current virtual object in the virtual scene, wherein the marker indication information is transmitted by a server when the target virtual item is detected to be located within a visible distance of the current virtual object;
    obtaining graphic data of a marker element according to the marker indication information, the marker element being a graphic element used for indicating a location of the target virtual item in the virtual scene to the user accounts in the same team; and
    rendering the marker element according to the graphic data at a designated location around the target virtual item in the display interface of the virtual scene.

2. The method according to claim 1, further comprising:
    obtaining distance information, the distance information being used for indicating a distance between the target virtual item and the current virtual object; and
    displaying the distance information at a designated location around the marker element in the display interface.

3. The method according to claim 2, wherein the distance information comprises at least one type of the following information:
    a straight-line distance between the target virtual item and the current virtual object;
    a horizontal distance between the target virtual item and the current virtual object; and
    a height difference between the target virtual item and the current virtual object.

4. The method according to claim 1, wherein the display interface further comprises a thumbnail map of the virtual scene, and the method further comprises:
    displaying a marker icon of the target virtual item in the thumbnail map corresponding to a location of the target virtual item in the thumbnail map.

5. The method according to claim 1, further comprising:
    displaying a crosshair icon in the display interface, the crosshair icon being used for indicating a direction that the current virtual object faces;
    determining a virtual item targeted by the crosshair icon as the target virtual item in a case that a marking operation is received; and
    transmitting a marking request to the server, the marking request comprising an identifier of the target virtual item.

6. The method according to claim 5, further comprising:
    presenting a marker type selection interface in a case that the marking operation is received, the marker type selection interface comprising at least two marker options, each marker option corresponding to one marker type; and
    determining a target marker type in a case that a selection operation performed in the marker type selection interface is received, the target marker type being a marker type of a marker option corresponding to the selection operation; and
    the transmitting a marking request to the server comprises:
    transmitting the marking request comprising the identifier of the target virtual item and the target marker type to the server.

7. The method according to claim 1, wherein the marker indication information comprises a target marker type; and the obtaining graphic data of a marker element according to the marker indication information comprises:

obtaining the graphic data of the marker element according to the target marker type.

8. The method according to claim 1, wherein the marker indication information comprises object indication information, the object indication information being used for indicating a virtual object controlled by the user account corresponding to the terminal marking the target virtual item; and the obtaining graphic data of a marker element according to the marker indication information comprises:

obtaining the graphic data corresponding to the virtual object indicated by the object indication information.

9. The method according to claim 1, further comprising:

receiving marker cancellation information, the marker cancellation information being information transmitted by the server after a timing duration of a first timer reaches a first preset duration, the first timer being started at a moment at which the target virtual item is marked; and removing the marker element from the display interface of the virtual scene.

10. The method according to claim 1, further comprising:

removing the marker element from the display interface of the virtual scene in a case that a timing duration of a second timer reaches a second preset duration, the second timer being started at a moment at which the marker element is displayed.

11. A terminal, comprising a processor and a memory, the memory storing a plurality of computer-executable instructions, the plurality of computer-executable instructions, when being loaded and executed by the processor, causing the terminal to perform a plurality of operations including:

rendering a display interface of a virtual scene, the virtual scene including a plurality of virtual items;

obtaining marker indication information used for indicating a target virtual item, the target virtual item being a virtual item marked by a user of the terminal corresponding to a user account in the virtual scene for user accounts in a same team to view, the user account controlling a current virtual object in the virtual scene, wherein the marker indication information is transmitted by a server when the target virtual item is detected to be located within a visible distance of the current virtual object;

obtaining graphic data of a marker element according to the marker indication information, the marker element being a graphic element used for indicating a location of the target virtual item in the virtual scene to the user accounts in the same team; and rendering the marker element according to the graphic data at a designated location around the target virtual item in the display interface of the virtual scene.

12. The terminal according to claim 11, wherein the plurality of operations further comprise:

obtaining distance information, the distance information being used for indicating a distance between the target virtual item and the current virtual object; and displaying the distance information at a designated location around the marker element in the display interface.

13. The terminal according to claim 12, wherein the distance information comprises at least one type of the following information:

a straight-line distance between the target virtual item and the current virtual object;

a horizontal distance between the target virtual item and the current virtual object; and a height difference between the target virtual item and the current virtual object.

14. The terminal according to claim 11, wherein the display interface further comprises a thumbnail map of the virtual scene, and the method further comprises:

displaying a marker icon of the target virtual item in the thumbnail map corresponding to a location of the target virtual item in the thumbnail map.

15. The terminal according to claim 11, wherein the plurality of operations further comprise:

receiving marker cancellation information, the marker cancellation information being information transmitted by the server after a timing duration of a first timer reaches a first preset duration, the first timer being started at a moment at which the target virtual item is marked; and removing the marker element from the display interface of the virtual scene.

16. The terminal according to claim 11, wherein the plurality of operations further comprise:

removing the marker element from the display interface of the virtual scene in a case that a timing duration of a second timer reaches a second preset duration, the second timer being started at a moment at which the marker element is displayed.

17. A non-transitory computer-readable storage medium, storing a plurality of computer-executable instructions, the plurality of computer-executable instructions, when being loaded and executed by a processor of a terminal, causing the terminal to perform a plurality of operations including:

rendering a display interface of a virtual scene, the virtual scene including a plurality of virtual items;

obtaining marker indication information used for indicating a target virtual item, the target virtual item being a virtual item marked by a user of the terminal corresponding to a user account in the virtual scene for user accounts in a same team to view, the user account controlling a current virtual object in the virtual scene, wherein the marker indication information is transmitted by a server when the target virtual item is detected to be located within a visible distance of the current virtual object;

obtaining graphic data of a marker element according to the marker indication information, the marker element being a graphic element used for indicating a location of the target virtual item in the virtual scene to the user accounts in the same team; and rendering the marker element according to the graphic data at a designated location around the target virtual item in the display interface of the virtual scene.

18. The non-transitory computer-readable storage medium according to claim 17, wherein the plurality of operations further comprise:

obtaining distance information, the distance information being used for indicating a distance between the target virtual item and the current virtual object; and displaying the distance information at a designated location around the marker element in the display interface.

19. The non-transitory computer-readable storage medium according to claim 17, wherein the display interface further comprises a thumbnail map of the virtual scene, and the plurality of operations further comprise:

displaying a marker icon of the target virtual item in the thumbnail map corresponding to a location of the target virtual item in the thumbnail map.

20. The non-transitory computer-readable storage medium according to claim 17, wherein the marker indication information comprises a target marker type; and the obtaining graphic data of a marker element according to the marker indication information comprises:

obtaining the graphic data of the marker element according to the target marker type.

\* \* \* \* \*